United States Patent
Stadlbauer et al.

(10) Patent No.: US 7,799,841 B2
(45) Date of Patent: Sep. 21, 2010

(54) POLYPROPYLENE FOAM

(75) Inventors: Manfred Stadlbauer, Linz (AT); Eberhard Ernst, Unterweitersdorf (AT)

(73) Assignee: Borealis Technology Oy (FI)

( * ) Notice: Subject to any disclaimer, the term of this patent is extended or adjusted under 35 U.S.C. 154(b) by 0 days.

(21) Appl. No.: 12/367,911

(22) Filed: Feb. 9, 2009

(65) Prior Publication Data

US 2009/0176902 A1 Jul. 9, 2009

Related U.S. Application Data

(63) Continuation of application No. PCT/EP2007/007470, filed on Aug. 25, 2007.

(30) Foreign Application Priority Data

Aug. 25, 2006 (EP) .................. 06017790

(51) Int. Cl.
- C08J 9/00 (2006.01)
- C08L 47/00 (2006.01)
- C08L 23/12 (2006.01)
- B29C 44/34 (2006.01)
- C08F 8/00 (2006.01)

(52) U.S. Cl. .................. 521/142; 521/79; 521/140; 521/143; 525/191; 525/240

(58) Field of Classification Search .................. 521/142, 521/79, 140, 143, 144; 525/191, 240; 526/65

See application file for complete search history.

(56) References Cited

U.S. PATENT DOCUMENTS

| | | | |
|---|---|---|---|
| 4,404,342 A | 9/1983 | Miyoshi et al. | |
| 4,483,971 A | 11/1984 | Sato et al. | |
| 4,634,745 A | 1/1987 | Ehrig et al. | |
| 4,701,432 A | 10/1987 | Welborn, Jr. | |

(Continued)

FOREIGN PATENT DOCUMENTS

DE 203 915 11/1983

(Continued)

OTHER PUBLICATIONS

Chujo, R. Heptad configurational analysis of 13C N.M.R. spectra in highly isotactic polypropylene, *Polymer* 29, vol. 29, January, pp. 138-143 (1988).

(Continued)

*Primary Examiner*—Randy Gulakowski
*Assistant Examiner*—Kara Negrelli
(74) *Attorney, Agent, or Firm*—McAndrews, Held & Malloy, Ltd.

(57) ABSTRACT

The present technology relates to a foam comprising a polypropylene material. The polypropylene material is produced in the presence of a metallocene catalyst, and the foam and/or the polypropylene has a branching index g' of less than 1.00 and a strain hardening index (SHI@1 s$^{-1}$) of at least 0.30 measured by a deformation rate dε/dt of 1.00 s$^{-1}$ at a temperature of 180° C., where the strain hardening index (SHI) is defined as the slope of the logarithm to the basis 10 of the tensile stress growth function ($\log(\eta_E^+)$) as a function of the logarithm to the basis 10 of the Hencky strain ($\log(\varepsilon)$) in the range of Hencky strains between 1 and 3.

23 Claims, 4 Drawing Sheets

U.S. PATENT DOCUMENTS

| | | | |
|---|---|---|---|
| 4,808,561 | A | 2/1989 | Welborn, Jr. |
| 5,250,631 | A | 10/1993 | McCullough, Jr. |
| 5,326,625 | A | 7/1994 | Schuhmann et al. |
| 5,948,547 | A | 9/1999 | Milkielski et al. |
| 6,086,982 | A | 7/2000 | Peiffer et al. |
| 6,147,309 | A * | 11/2000 | Mottine et al. .......... 174/110 PM |
| 6,225,432 | B1 | 5/2001 | Weng et al. |
| 6,482,895 | B2 * | 11/2002 | Maugans et al. ............ 525/191 |
| 6,805,930 | B2 | 10/2004 | Hanada et al. |
| 2002/0173602 | A1 | 1/2002 | Appleyard |
| 2002/0198318 | A1 | 12/2002 | Obata |
| 2004/0010087 | A1 | 1/2004 | Obata et al. |
| 2004/0072005 | A1 | 4/2004 | German |
| 2005/0090571 | A1 | 4/2005 | Mehta |
| 2008/0058437 | A1* | 3/2008 | Burgun et al. ............... 521/140 |
| 2009/0062494 | A1* | 3/2009 | Ernst et al. .................. 526/161 |
| 2009/0131611 | A1* | 5/2009 | Stadlbauer et al. ............ 526/65 |
| 2009/0149614 | A1* | 6/2009 | Loyens et al. ................ 526/172 |
| 2009/0169907 | A1* | 7/2009 | Stadlbauer et al. .......... 428/523 |
| 2009/0312178 | A1* | 12/2009 | Ernst et al. .................. 502/152 |

FOREIGN PATENT DOCUMENTS

| | | |
|---|---|---|
| DE | 3 539 352 | 5/1986 |
| DE | 198 27 327 | 12/1999 |
| DE | 199 49 235 | 5/2000 |
| EP | 0 36 457 | 9/1981 |
| EP | 0 190 889 | 8/1986 |
| EP | 0 384 431 | 8/1990 |
| EP | 0 887 379 | 12/1990 |
| EP | 0 674 325 | 9/1995 |
| EP | 0 674 991 | 10/1995 |
| EP | 0 690 458 | 1/1996 |
| EP | 0 696 458 | 1/1996 |
| EP | 0 747 212 | 11/1996 |
| EP | 0 745 637 | 12/1996 |
| EP | 0 873 862 | 10/1998 |
| EP | 0 879 830 | 11/1998 |
| EP | 0 885 918 | 12/1998 |
| EP | 0 893 802 | 1/1999 |
| EP | 0 919 572 | 6/1999 |
| EP | 0 942 013 | 9/1999 |
| EP | 1 295 910 | 3/2003 |
| EP | 1 302 310 | 4/2003 |
| EP | 1 367 068 | 12/2003 |
| EP | 1 408 077 | 4/2004 |
| EP | 1 429 346 | 6/2004 |
| EP | 1 484 345 | 12/2004 |
| EP | 1 495 861 | 1/2005 |
| EP | 1 634 699 | 3/2006 |
| EP | 1 724 289 | 11/2006 |
| EP | 1 726 602 | 11/2006 |
| EP | 1 726 603 | 11/2006 |
| EP | 1 847 551 | 10/2007 |
| EP | 1 847 552 | 10/2007 |
| EP | 1 847 555 | 10/2007 |
| JP | 2001/0168431 | 6/1999 |
| JP | 2001/354814 | 7/2000 |
| JP | 2003 147110 | 11/2001 |
| JP | 2002 363356 | 12/2002 |
| JP | 2003-147110 * | 5/2003 |
| JP | 2006/022276 | 6/2004 |
| WO | WO 92/12182 | 7/1992 |
| WO | WO 94/28034 | 12/1994 |
| WO | WO 95/30708 | 11/1995 |
| WO | WO 97/22633 | 6/1997 |
| WO | WO 98/10016 | 3/1998 |
| WO | WO 98/58971 | 12/1998 |
| WO | WO 99/09096 | 2/1999 |
| WO | WO 99/24478 | 5/1999 |
| WO | WO 99/29742 | 6/1999 |
| WO | WO 00/12572 | 3/2000 |
| WO | WO 00/68315 | 11/2000 |
| WO | WO 00/73369 | 12/2000 |
| WO | WO 00/78858 | 12/2000 |
| WO | WO 01/25296 | 4/2001 |
| WO | WO 01/48034 | 7/2001 |
| WO | WO 01/98409 | 12/2001 |
| WO | WO 02/16455 | 2/2002 |
| WO | WO 02/44251 | 6/2002 |
| WO | WO 02/090400 | 11/2002 |
| WO | WO03/000754 | 1/2003 |
| WO | WO 03/040233 | 5/2003 |
| WO | WO 03/051934 | 6/2003 |
| WO | WO 2004/013193 | 2/2004 |
| WO | WO2004/026921 | 4/2004 |
| WO | WO 2004/037871 | 5/2004 |
| WO | WO2004/046208 | 6/2004 |
| WO | WO2004/052950 | 6/2004 |
| WO | WO 2005/044877 | 5/2005 |
| WO | WO 2006/118890 | 11/2006 |
| WO | WO 2008/022803 | 2/2008 |

OTHER PUBLICATIONS

Chujo R., Two-site model analysis of 13C n.m.r. of polypropylene polymerized by Ziegler-Natta catalyst with external alkoxysilane donors, *Polymer*, vol. 35, past II, pp. 339-342 (1994).

Sentmanat, Rheol, *Measuring the Transient Extension Rheology of Polythylene Melts Using the SER Universal Testing Platform*, J. Rheology, May/June Issue, pp. 1-20 (2005).

Zimm, B.H. and Stockmayer, Walter The Dimension of Chain Molecules Containing Branches and Rings, *The Journal of Chemical Physics*, vol. 17, No. 12, pp. 1301-1314 (1949).

Hayashi, et al., 13C N.M.R. spectral assignments and hexad comonomer sequence determination in stereoregular ethylene-propylene copolymer, *Polymer*, vol. 29, pp. 1848-1847 (1988).

Polypropylene Process Review, Does Borstar shine? *ECN Chemscope*, May 1999, pp. 17-18, 20-21.

Pinter, Gerald et al., *Accelerated quality assurance tests for PE pipe grades*, 64th Annual Technical Conference, pp. 2080-2084, Society of Plastics Engineers, (2006).

Cazenave, J., et al., Short-term mechanical and structural approaches for the evaluation of polyethylene stress crack resistance Groupe d'Etude de Metallurgie Physique et de Physique des Materiaux, *Polymer 47*, pp. 3904-3914 (2006).

Gahleitner, Markus et al., Propylene-ethylene random copolymers: comonomer effects on crystallinity and application properties, *Journal of Applied Polymer Science*, (2005), 95(5), 1073-1081; AAAAAAA.

Haager, Markus et al., *Estimation of slow crack growth behavior in polyethylene after stepwise isothermal crystallization*, Macromolecular Symposia (2004), 217 (Contributions from 6th Austrian Polymer Meeting, 2003), 383-390; AAAAAAA.

Nezbedova, E et al., Influence of processing conditions on the structural and fracture behavior of PP pipe grades, *Journal of Macromolecular Science*, Part B Physics, B41 Nos. 4-6, pp. 711-723, (2002).

Nezbedova, E. et al., Brittle failure versus structure of HDPE pipe resins, *Journal of Macromolecular Science*, Part B Physics, B40 3&4, pp. 507-515, (2001).

Nezbedova, E, et al., Relation of slow crack growth failure time to structure of HDPE, *Mechanics of Time-Dependent Materials 5*, pp. 67-78, (2001).

Nezbedova, E., et al., The Relationship Between Fracture Behavior and Structural Parameters of HDPE, *Plastics Pipeline Systems for the Millenium*, pp. 349-357 (1998).

Lodefier, Ph., et al., Chemical Heterogeneity of Poly(ethylene terephthalate) As Revealed by Temperature Rising Elution Fractionation and Its Influence on Polymer Thermal Behavior: A Comparison with Poly(ethylene terephthalate-co-isophthalate) *Macromolecules*, vol. 32 No. 21, pp. 7135-7139 (1999).

Hanyu, Aiko et al., Properties and film applications of metallocene-based isotactic polypropylenes, *Journal of Plastic Film & Sheeting*, vol. 15 No. 5, pp. 109-119, (1999).

Gueugnaut, D., et al., Detection of divergences in polyethylene resins fabrication by means of the modified stepwise isothermal segregation technique, *Journal of Applied Polymer Science*, vol. 73 No. 11, pp. 2103-2112, (1999).

Scholten F.L., et al., GERG materials bank of PE gas pipe grades. Recent developments, *Proceedings of the International Gas Research Conference*, vol. 3, pp. 257-268, (1998).

Hanyu, Aiko, et al., Properties and film applications of metallocene-based isotactic polypropylenes, *56th Society of Plastics Engineers Annual Technical Conference*, vol. 2, pp. 1887-1891, (1998).

Ishikawa, Narumi, Study on the physical properties of polyethylene pipes for gas, *Nisseki Rebyu Nippon Sekiyu*, 32-(4), pp. 153-8, 1990.

Rätzsch, Radical reactions on polypropylene in the solid state, *Progress in Polymer Science*, Issue 27, pp. 1195-1282 (2002).

J. Dealy, "Structure and Rheology of Molten polymers", *Hanser Publishers* Munich, Germany, pp. 377-386, 2006.

Naguib E. Hani, Fundamental Foaming Mechanisms Governing the Volume Expansion of Extruded Polypropylene Foams, *Journal Applied. Poly. Science*, 91 pp. 2662-2668, (2008).

S. T. Lee, Foam Extrusion Principles and Practice, *Technomic Publishing*, pp. 1-15 (2000).

Virkkunen, Ville, et. al, Tacticity distribution of isotactic polypropylene prepared with heterogeneous Ziegler-Natta Catalyst. 2. Application and analysis of SSA data for polypropylene. *Polymer*, vol. 45, pp. 4623-4631, (2004).

Maria de Fátima Vieira Marques, et, al, Propylene Polymerization using combined Syndio- and isospecific metallocene catalysts supported on silica/MAO, *Journal of Applied Polymer Science*, vol. 99, pp. 628-637, (2006).

Spaleck, Walter, Synthesis and Properties of Metallocene Catalysts for Isotopic Polypropylene Production, *Metallocene-based Polyoefins*, pp. 400-424, (2000).

J Krupka, R G Geyer, J Baker-Jarvis and J Ceremuga, 'Measurements of the complex permittivity of microwave circuit board substrates using a split dielectric resonator and re-entrant cavity techniques', Proceedings of the Conference on Dielectric Materials, Measurements and Applications—DMMA '96, Bath, UK, published by the IEE, London, 1996.].

J Krupka, R N Clarke, O C Rochard and A P Gregory, 'Split-Post Dielectric Resonator technique for precise measurements of laminar dielectric specimens—measurement uncertainties', Proceedings of the XIII Int. Conference MIKON'2000, Wroclaw, Poland, pp. 305-308, 2000.

Ed. J. Sheirs, W. Kaminski, "Metallocenebased Polyolefines" vol. 1 (1999) 401-424.

Product info sheet, Basell Polyolefins Company, "Pro-faxPF814", pp. 1 and 2.

The Dow Company, Commercial Product JQDB-2230NT of Dow, "Technical information for wire and cable" Telecom, pp. 1-2, Mar. 2005.

Product info sheet, Borealis Tech, "High-Melt Strength Polypropylene for Foam Excursion" pp. 1-4, edition 8 (2004).

Product information sheet, Polypropylene Daploy TM WB130HMS High-Melt Strength Polypropylene for Foam Extrusion.

* cited by examiner

Determination of the SHI of Y/H-shaped polypropylene sample A at a strain rate of $0.1 s^{-1}$ (SHI@$0.1 s^{-1}$ is determined to be 2.06)

POLYPROPYLENE FOAM

RELATED APPLICATIONS

This application is a continuation of International Application Serial No. PCT/EP2007/007470 (International Publication Number WO 2008/022804), having an International filing date of Aug. 25, 2007 entitled "Polypropylene Foam". International Application No. PCT/EP2007/007470 claimed priority benefits, in turn, from European Patent Application No. 06017790.4, filed Aug. 25, 2006. International Application No. PCT/EP2007/007470 and European Application No. 06017790.4 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates to a polypropylene foam having an even foam surface and small cell size. It also relates to the use of multibranched polypropylene for the preparation of foam.

Thermoplastic foams possess a cellular structure generated by the expansion of a blowing agent. The cellular structure provides unique properties that enable the foamed plastics to be used for various industrial applications. Due to their outstanding functional characteristics and low material cost, polypropylene foams have been considered as a substitute for other thermoplastic foams in industrial applications. In particular, they have higher rigidity compared to other polyolefins, offer higher strength than polyethylene and better impact strength than polystyrene. Furthermore, they provide a higher service temperature range and good temperature stability.

However, polypropylene is suffering from some serious drawbacks, limiting its use for the preparation of foams. In particular, many polypropylene materials have low melt strength and/or low melt extensibility.

Polypropylene foams are made in a foam extrusion process wherein a gas-laden melt is suddenly expanded through pressure drop after the extrusion die. Such an expansion induces extensional flow to the polymer melt and sets certain requirements to the extensional rheology of the melt. In particular, high melt strength and/or high melt extensibility are required. If these conditions are not met, bubble film rupture is more likely to occur and the average foam cell size will decrease due to bubble coalescence. Increasing bubble size results in a decrease of impact strength of the foam.

At present, two polypropylene-based systems are used in the industry for the preparation of foams:

1) Linear, bimodal high molecular weight polypropylene obtained either from copolymerisation of propylene with comonomers such as ethylene or from reacting a coupling agent with polypropylene. EP-A-0887379 discloses the preparation of linear bimodal polypropylene in a multi-step process using at least one slurry reactor and at least one gas phase reactor. WO 00/78858 discloses a coupled propylene copolymer prepared by reacting a coupling agent such as polysulfonyl azide with a propylene copolymer.

Due to the high molecular weight, these polymers have a high zero shear viscosity. However, they have reduced output from the extruder because a high pressure is built up in the extrusion line.

2) Y/H-shaped polypropylenes from post-reactor processes such as irradiation or peroxide treatment or from copolymerisation of propylene with dienes in the presence of a metallocene catalyst. WO 2005/044877 discloses a foamed article comprising a propylene/α-ω diene copolymer. EP-A-0879830 discloses Y/H-shaped polypropylene from peroxide treatment.

However, Y/H-shaped polypropylenes are inherently inhomogeneous, contain gels and show a low number of cells, thereby adversely affecting foam surface quality.

BRIEF SUMMARY OF THE INVENTION

Considering the problems outlined above, it is an object of the present technology to provide a polypropylene foam having improved foam surface properties such as high surface evenness, and a small cell size. Furthermore, the preparation of such a foam should be possible with high output at the foaming line without adversely affecting surface properties and cell size. Thus, the present technology intends to provide an improved balance between processibility and final foam properties.

In a first aspect of the present technology, the object is solved by providing a foam comprising a polypropylene, wherein the polypropylene material is produced in the presence of a metallocene catalyst. In certain embodiments it is preferred that the polypropylene material is produced in the presence of a metallocene catalyst as further defined below. The foam and/or the polypropylene of the present technology has a. a branching index g' of less than 1.00 and b. a strain hardening index (SHI@1 s$^{-1}$) of at least 0.30 measured by a deformation rate dε/dt of 1.00 s$^{-1}$ at a temperature of 180° C., wherein the strain hardening index (SHI) is defined as the slope of the logarithm to the basis 10 (1 g or log) of the tensile stress growth function ($\log(\eta_E^+)$) as a function of the logarithm to the basis 10 of the Hencky strain ($\log(\epsilon)$) in the range of Hencky strains between 1 and 3.

Preferably the foam is free of polyethylene, even more preferred the foam comprises a polypropylene as defined above and further defined below as the only polymer component.

Certain embodiments provide a foam comprising a polypropylene material, wherein at least one of the film and the polypropylene material have a multi-branching index of at least 0.15. The multi-branching index is defined as a slope of a strain hardening index as a function of a logarithm to the basis 10 of a Hencky strain rate, defined as ($\log(d\epsilon/dt)$), wherein dε/dt is the deformation rate, ε is the Hencky strain, and the strain hardening index is measured at a temperature of 180° C. The strain hardening index is defined as a slope of a logarithm to the basis 10 of the tensile stress growth function as a function of a logarithm to the basis 10 of the Hencky strain in the range of Hencky strains between 1 and 3.

Certain embodiments of the present technology provide methods and processes for producing the aforementioned foam and polypropylene material.

DETAILED DESCRIPTION OF THE INVENTION

Figure 1:
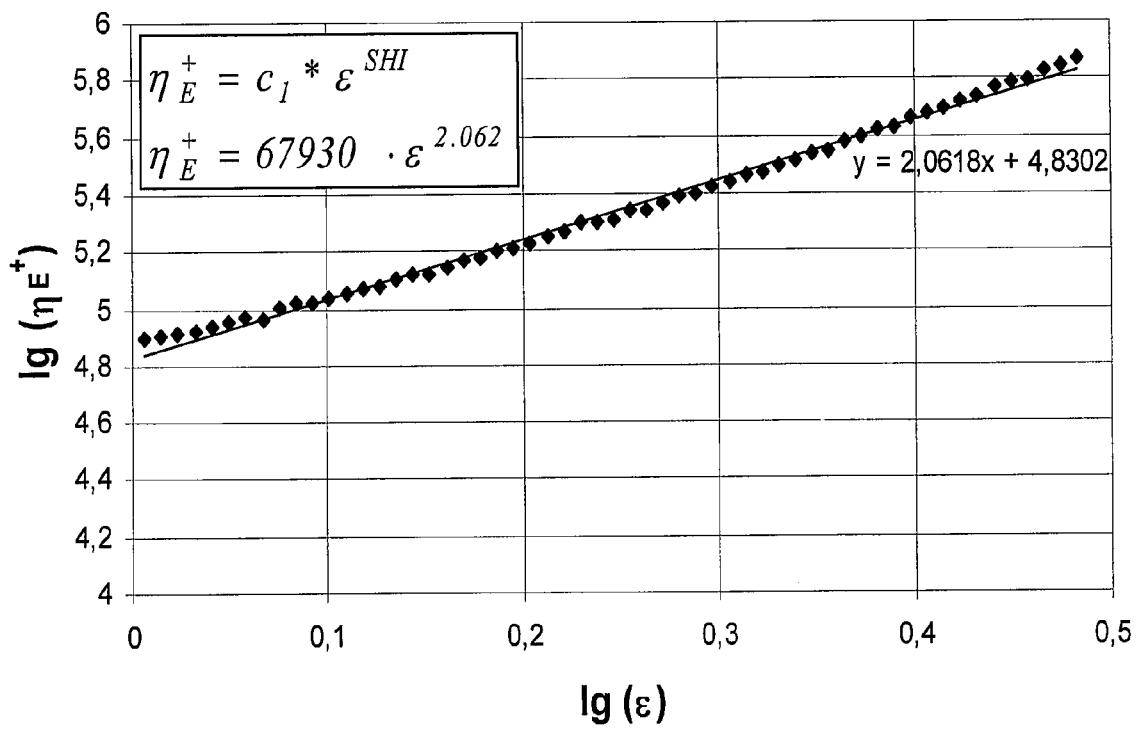
FIG. 1 is a graph depicting the determination of the SHI of Y/H-shaped polypropylene sample "A" at a strain rate of 0.1 s$^{-1}$ (SHI@0.1 s$^{-1}$ is determined to be 2.06).

The present technology is based on the finding that an improved balance between processibility and final foam properties can be achieved by using a polypropylene which has a specific branching structure.

The foam of the present technology comprises a polypropylene which is characterized in particular by extensional melt flow properties. The extensional flow, or deformation that involves the stretching of a viscous material, is the dominant type of deformation in converging and squeezing flows that occur in typical polymer processing operations. Extensional melt flow measurements are particularly useful in polymer characterization because they are very sensitive to the molecular structure of the polymeric system being tested. When the true strain rate of extension, also referred to as the Hencky strain rate, is constant, simple extension is said to be a "strong flow" in the sense that it can generate a much higher degree of molecular orientation and stretching than flows in simple shear. As a consequence, extensional flows are very sensitive to crystallinity and macro-structural effects, such as long-chain branching, and as such can be far more descriptive with regard to polymer characterization than other types of bulk rheological measurement which apply shear flow.

The first requirement according to the present technology is that the foam and/or the polypropylene present within said foam has/have a branching index g' of less than 1.00, more preferably less than 0.90, still more preferably less than 0.80. In the preferred embodiment, the branching index g' shall be less than 0.75. On the other hand it is preferred that the branching index g' is more than 0.6, still more preferably 0.7 or more. Thus it is preferred that the branching index g' of the polypropylene is in the range of 0.6 to below 1.0, more preferred in the range of more than 0.65 to 0.95, still more preferred in the range of 0.7 to 0.95. The branching index g' defines the degree of branching and correlates with the amount of branches of a polymer. The branching index g' is defined as g'=[IV]$_{br}$/[IV]$_{lin}$ in which g' is the branching index of the foam or the polypropylene component, [IV$_{br}$] is the intrinsic viscosity of either the foam comprising the branched polypropylene if g' of the foam shall be determined or of the branched polypropylene if g' of the polypropylene shall be determined, and [IV]$_{lin}$ is the intrinsic viscosity of either the foam comprising a linear polypropylene having the same weight average molecular weight (within a range of ±10%) as the branched polypropylene if g' of the foam shall be determined or of a linear polypropylene having the same weight average molecular weight (within a range of ±10%) as the branched polypropylene if g' of the branched polypropylene shall be determined. Thereby, a low g'-value is an indicator for a highly branched polymer. In other words, if the g'-value decreases, the branching of the polypropylene increases. Reference is made in this context to B. H. Zimm and W. H. Stockmeyer, J. Chem. Phys. 17, 1301 (1949). This document is herewith incorporated by reference.

The intrinsic viscosity needed for determining the branching index g' is measured according to DIN ISO 1628/1, October 1999 (in Decalin at 135° C.).

A further requirement is that the strain hardening index (SHI@1 s$^{-1}$) of the foam and/or the polypropylene present within said foam shall be at least 0.30, more preferred of at least 0.40, still more preferred of at least 0.50. In a preferred embodiment the strain hardening index (SHI@1 s$^{-1}$) is at least 0.55.

The strain hardening index is a measure for the strain hardening behavior of the melted foam or the polypropylene melt. In the present technology, the strain hardening index (SHI@1 s$^{-1}$) has been measured by a deformation rate dε/dt of 1.00 s$^{-1}$ at a temperature of 180° C. for determining the strain hardening behavior, wherein the strain hardening index (SHI) is defined as the slope of the tensile stress growth function $\eta_E^+$ as a function of the Hencky strain ε on a logarithmic scale between 1.00 and 3.00 (see FIG. 1). Thereby the Hencky strain ε is defined by the formula ε=$\dot{\epsilon}_H$·t, wherein the Hencky strain rate $\dot{\epsilon}_H$ is defined by the formula $$\dot{\epsilon}_H = \frac{2 \cdot \Omega \cdot R}{L_0} [s^{-1}]$$

with

"L$_0$" is the fixed, unsupported length of the specimen sample being stretched which is equal to the centerline distance between the master and slave drums "R" is the radius of the equi-dimensional windup drums, and "Ω" is a constant drive shaft rotation rate.

In turn the tensile stress growth function $\eta_E^+$ is defined by the formula $$\eta_E^+(\varepsilon) = \frac{F(\varepsilon)}{\dot{\varepsilon}_H \cdot A(\varepsilon)}$$

with $$T(\varepsilon) = 2 \cdot R \cdot F(\varepsilon)$$

and $$A(\varepsilon) = A_0 \cdot \left(\frac{d_S}{d_M}\right)^{2/3} \cdot \exp(-\varepsilon);$$

wherein the Hencky strain rate $\dot{\epsilon}_H$ is defined as for the Hencky strain ε

"F" is the tangential stretching force

"R" is the radius of the equi-dimensional windup drums

"T" is the measured torque signal, related to the tangential stretching force "F"

"A" is the instantaneous cross-sectional area of a stretched molten specimen

"A$_0$" is the cross-sectional area of the specimen in the solid state (i.e. prior to melting), "d$_s$" is the solid state density and "d$_M$" the melt density of the polymer.

Preferably, the polypropylene used for the preparation of the foam is not crosslinked.

In a preferred embodiment of the first aspect of the present technology, the foam and/or the polypropylene has/have a multi-branching index (MBI) of at least 0.15, wherein the multi-branching index (MBI) is defined as the slope of the strain hardening index (SHI) as a function of the logarithm to the basis 10 of the Hencky strain rate (log(dε/dt)). Multi-branching index (MBI) will be explained in further detail below.

It is preferred that the polypropylene used for the preparation of the foam of the present technology shows strain rate thickening which means that the strain hardening increases with extension rates. Similar to the measurement of SHI@1 s$^{-1}$, a strain hardening index (SHI) can be determined at different strain rates. A strain hardening index (SHI) is defined as the slope of the logarithm to the basis 10 of the tensile stress growth function $\eta_E^+$, $\log(\eta_E^+)$, as a function of the logarithm to the basis 10 of the Hencky strain $\epsilon$, $\log(\epsilon)$, between Hencky strains 1.00 and 3.00 at a at a temperature of 180° C., where a SHI@0.1 s$^{-1}$ is determined with a deformation rate $\dot{\epsilon}_H$ of 0.10 s$^{-1}$, a SHI@0.3 s$^{-1}$ is determined with a deformation rate $\dot{\epsilon}_H$ of 0.30 s$^{-1}$, a SHI@1 s$^{-1}$ is determined with a deformation rate $\dot{\epsilon}_H$ of 1.00 s$^{-1}$, a SHI@3 s$^{-1}$ is determined with a deformation rate $\dot{\epsilon}_H$ of 3.00 s$^{-1}$, and a SHI@10 s$^{-1}$ is determined with a deformation rate $\dot{\epsilon}_H$ of 10.0 s$^{-1}$. In comparing the strain hardening index (SHI) at those five strain rates $\dot{\epsilon}_H$ of 0.10, 0.30, 1.00, 3.00 and 10.0 s$^{-1}$, the slope of the strain hardening index (SHI) as a function of the logarithm to the basis 10 of $\dot{\epsilon}_H$ ($\log(\dot{\epsilon}_H)$) is a characteristic measure for multi-branching. Therefore, a multi-branching index (MBI) is defined as the slope of SHI as a function of $\log(\dot{\epsilon}_H)$, i.e. the slope of a linear fitting curve of the strain hardening index (SHI) versus $\log(\dot{\epsilon}_H)$ applying the least square method, preferably the strain hardening index (SHI) is defined at deformation rates $\dot{\epsilon}_H$ between 0.05 s$^{-1}$ and 20.00 s$^{-1}$, more preferably between 0.10 s$^{-1}$ and 10.0 s$^{-1}$, still more preferably at the deformations rates 0.10, 0.30, 1.00, 3.00 and 10.0 s$^{-1}$. Yet more preferably the SHI-values determined by the deformations rates 0.10, 0.30, 1.00, 3.00 and 10.0 s$^{-1}$ are used for the linear fit according to the least square method when establishing the multi-branching index (MBI).

It is in particular preferred that the foam of the present technology and/or the polypropylene present within said foam has/have a branching index g' of less than 1.00, a strain hardening index (SHI@1 s$^{-1}$) of at least 0.30 and multi-branching index (MBI) of at least 0.15. Still more preferred the foam and/or its polypropylene component has/have a branching index g' of less than 0.80, a strain hardening index (SHI@1 s$^{-1}$) of at least 0.40 and multi-branching index (MBI) of at least 0.15. In another preferred embodiment, the foam and/or its polypropylene component has/have a branching index g' of less than 1.00, a strain hardening index (SHI@1 s$^{-1}$) of at least 0.30 and multi-branching index (MBI) of at least 0.20. In still another preferred embodiment, the foam and/or its polypropylene component has/have a branching index g' of less than 0.80, a strain hardening index (SHI@1 s$^{-1}$) of at least 0.40 and multi-branching index (MBI) of at least 0.20. In yet another preferred embodiment, the foam and/or its polypropylene component has/have a branching index g' of less than 0.80, a strain hardening index (SHI@1 s$^{-1}$) of at least 0.50 and multi-branching index (MBI) of at least 0.30.

As discussed above, the foam of the present technology comprises a polypropylene having a specific branching structure, i.e. multi-branched polypropylene. Such multi-branched polypropylene is characterized by the fact that its strain hardening index (SHI) increases with the deformation rate $\dot{\epsilon}_H$, i.e. a phenomenon which is not observed in other polypropylenes. Single branched polymer types (so called Y polymers having a backbone with a single long side-chain and an architecture which resembles a "Y") or H-branched polymer types (two polymer chains coupled with a bridging group and a architecture which resemble an "H") as well as linear or short chain branched polymers do not show such a relationship, i.e. the strain hardening index (SHI) is not influenced by the deformation rate (see FIGS. 2 and 3). Accordingly, the strain hardening index (SHI) of known polymers, in particular known polypropylenes and polyethylenes, does not increase or increases only negligibly with an increase of the deformation rate (d$\epsilon$/dt). Industrial conversion processes which imply elongational flow operate at very fast extension rates. Hence the advantage of a material which shows more pronounced strain hardening (measured by the strain hardening index SHI) at high strain rates becomes obvious. The faster the material is stretched, the higher the strain hardening index (SHI) and hence the more stable the material will be in conversion. Especially in the fast extrusion process, the melt of the multi-branched polypropylenes has a high stability.

Further information concerning the measuring methods applied to obtain the relevant data for the branching index g', the tensile stress growth function $\eta_E^+$, the Hencky strain rate $\dot{\epsilon}_H$, the Hencky strain $\epsilon$ and the multi-branching index (MBI) is provided in the example section.

As explained above, the multi-branching index MBI is also a parameter which is very sensitive to the branching structure of a polymeric material and can be used to characterize the foam of the present technology. Thus, in a second aspect of the present technology, there is provided a foam comprising a polypropylene, wherein the foam and/or the polypropylene has (have) a multi-branching index (MBI) of at least 0.15, wherein the multi-branching index (MBI) is defined as the slope of the strain hardening index (SHI) as a function of the logarithm to the basis 10 of the Hencky strain rate ($\log(d\epsilon/dt)$), wherein d$\epsilon$/dt is the deformation rate, $\epsilon$ is the Hencky strain, and the strain hardening index (SHI) is measured at 180° C., wherein the strain hardening index (SHI) is defined as the slope of the logarithm to the basis 10 of the tensile stress growth function ($\log(\eta_E^+)$) as a function of the logarithm to the basis 10 of the Hencky strain ($\log(\epsilon)$) in the range of Hencky strains between 1 and 3.

Preferably, the multi-branching index (MBI) is at least 0.20, and still more preferred at least 0.25. In a still more preferred embodiment the multi-branching index (MBI) is at least 0.28.

Preferably the foam is free of polyethylene, even more preferred the foam comprises a polypropylene as defined above and further defined below as the only polymer component.

Preferably said polypropylene is produced in the presence of a metallocene catalyst, more preferably in the presence of a metallocene catalyst as further defined below.

In a preferred embodiment, the foam and/or the polypropylene present within said foam has/have a branching index g' of less than 1.00, more preferably less than 0.90, still more preferably less than 0.80. In the preferred embodiment, the branching index g' shall be less than 0.75. On the other hand it is preferred that the branching index g' is more than 0.6, still more preferably 0.7 or more. Thus it is preferred that the branching index g' of the polypropylene is in the range of 0.6 to below 1.0, more preferred in the range of more than 0.65 to 0.95, still more preferred in the range of 0.7 to 0.95.

Preferably, the strain hardening index (SHI@1 s$^{-1}$) shall be at least 0.30, more preferred at least 0.40, still more preferred at least 0.50. In a preferred embodiment the strain hardening index (SHI@1 s$^{-1}$) is at least 0.55.

The following statements apply to both aspects of the present technology as defined above.

Preferably, the polypropylene comprised by the foam of the present technology is not crosslinked.

Moreover it is preferred, that the foam is further characterized in that the foam has a smooth surface, i.e. the surface does not show many defects. An indication that the foam is rather defect free, is when the material used for the foam shows only few gels when converted into a film. Thus it is preferred that the foam material converted into a film has only gels with a diameter of equal or less than 500 µm, i.e. no gels with a diameter of more than 500 µm are present in said film (converted foam), and wherein said gels are not more than 100 gels per square meter (sqm), more preferably not more than 80 gels per square meter (sqm), and yet more preferably not more than 60 gels per square meter (sqm). In yet another preferred embodiment the converted foam material has only gels with a diameter of equal or less than 400 µm, i.e. no gels with a diameter of more than 500 µm are present in said film (converted foam), and wherein said gels are not more than 100 gels per square meter (sqm), more preferably not more than 80 gels per square meter (sqm), and yet more preferably not more than 60 gels per square meter (sqm). In still yet another preferred embodiment the converted foam material has only gels with a diameter of equal or less than 300 µm, i.e. no gels with a diameter of more than 500 µm are present in said film (converted foam), and wherein said gels are not more than 100 gels per square meter (sqm), more preferably not more than 80 gels per square meter (sqm), and yet more preferably not more than 60 gels per square meter (sqm).

Preferably, the polypropylene comprised by the foam of the present technology has an amount of hot xylene insolubles of less than 0.10 wt % (percent by weight), more preferably less than 0.05 wt %. The amount of hot xylene insolubles is determined by dissolving xylene hot solubles from the polymer in a soxhlet apparatus with boiling xylene for 2 days and measuring the mass fraction of the polypropylene material insoluble in boiling xylene. The amount of hot xylene insolubles indicates the degree of crosslinking, i.e. the higher the degree of crosslinking the higher the amount of polymer which does not dissolve in hot xylene. Polymers having crosslinked areas are of lower homogeneity and contain gels, thereby reducing the number of foam cells and deteriorating the foam surface. Furthermore, crosslinking has a detrimental effect on recycling properties.

In a preferred embodiment of the present technology, the polypropylene component of the foam has xylene solubles (XS) of less than 2.0 wt.-%, more preferably less than 1.50 wt %, and even more preferably less than 1.00 wt %. Xylene solubles are the part of the polymer soluble in cold xylene determined by dissolution in boiling xylene and letting the insoluble part crystallize from the cooling solution (for the method see below in the experimental part). The xylene solubles fraction contains polymer chains of low stereo-regularity and is an indication for the amount of non-crystalline areas. High levels of xylene solubles are detrimental for some applications as they represent potential contamination risk.

Furthermore, it is preferred that the foam comprises a polypropylene having a melt flow rate (MFR) given in a specific range. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$. Accordingly, it is preferred that in the present technology the polypropylene has an $MFR_2$ in a range of 0.01 to 1000 g/10 min, more preferably of 0.01 to 100 g/10 min, still more preferred of 0.05 to 50 g/10 min. In a preferred embodiment, the MFR is in a range of 1.00 to 11.00 g/10 min. In another preferred embodiment, the MFR is in a range of 3.00 to 11.00 g/10 min.

The number average molecular weight (Mn) is an average molecular weight of a polymer expressed as the first moment of a plot of the number of molecules in each molecular weight range against the molecular weight. In effect, this is the total molecular weight of all molecules divided by the number of molecules. In turn, the weight average molecular weight (Mw) is the first moment of a plot of the weight of polymer in each molecular weight range against molecular weight.

The number average molecular weight (Mn) and the weight average molecular weight (Mw) as well as the molecular weight distribution are determined by size exclusion chromatography (SEC) using Waters Alliance GPCV 2000 instrument with online viscometer. The oven temperature is 140° C. Trichlorobenzene is used as a solvent.

It is preferred that the polypropylene present within the foam has a weight average molecular weight (Mw) from 10,000 to 2,000,000 g/mol, more preferably from 20,000 to 1,500,000 g/mol.

More preferably, the polypropylene of the instant technology is isotactic. Thus the foam of the present technology comprises a polypropylene having a rather high pentad concentration, i.e. higher than 90%, more preferably higher than 92% and most preferably higher than 93%. In another preferred embodiment the pentad concentration is higher than 95%. The pentad concentration is an indicator for the narrowness in the stereo-regularity distribution of the polypropylene.

In addition, it is preferred that the polypropylene has a melting temperature Tm of higher than 120° C. It is in particular preferred that the melting temperature is higher than 120° C. if the polypropylene is a polypropylene copolymer as defined below. In turn, in case the polypropylene is a polypropylene homopolymer as defined below, it is preferred, that polypropylene has a melting temperature of higher than 150° C., more preferred higher than 155° C.

Not only the polypropylene itself but also the foam shall preferably comply with specific melting temperature requirements. Hence in case the polypropylene as defined above is a propylene homopolymer, it is preferred that the foam has a melting temperature Tm of higher than 145° C. It is in particular preferred that the melting temperature of the foam comprising the propylene homopolymer is higher than 150° C., more preferred higher than 155° C. In case the polypropylene as defined above is a propylene copolymer, it is preferred that the foam has a melting temperature Tm of higher than 120° C. It is in particular preferred that the melting temperature of the foam comprising the propylene copolymer is higher than 135° C., more preferred higher than 140° C.

In a preferred embodiment the polypropylene as defined above (and further defined below) is preferably unimodal. In another preferred embodiment the polypropylene as defined above (and further defined below) is preferably multimodal, more preferably bimodal.

"Multimodal" or "multimodal distribution" describes a frequency distribution that has several relative maxima. In particular, the expression "modality of a polymer" refers to the form of its molecular weight distribution (MWD) curve, i.e. the appearance of the graph of the polymer weight fraction as a function of its molecular weight. If the polymer is produced in the sequential step process, i.e. by utilizing reactors coupled in series, and using different conditions in each reactor, the different polymer fractions produced in the different reactors each have their own molecular weight distribution which may considerably differ from one another. The molecular weight distribution curve of the resulting final polymer can be seen at a super-imposing of the molecular weight distribution curves of the polymer fraction which will, accordingly, show a more distinct maxima, or at least be distinctively broadened compared with the curves for individual fractions.

A polymer showing such molecular weight distribution curve is called bimodal or multimodal, respectively.

In case the polypropylene of the foam is not unimodal it is preferably bimodal.

The polypropylene used for the preparation of the foam can be a homopolymer or a copolymer. Accordingly, the homopolymer as well as the copolymer can be a multimodal polymer composition.

The expression homopolymer used herein relates to a polypropylene that consists substantially, i.e. of at least 97 wt %, preferably of at least 99 wt %, and most preferably of at least 99.8 wt % of propylene units. In a preferred embodiment only propylene units in the polypropylene homopolymer are detectable. The comonomer content can be determined with FT infrared spectroscopy, as described below in the examples.

In case the polypropylene used for the preparation of the foam is a propylene copolymer, it is preferred that the comonomer is ethylene. However, also other comonomers known in the art are suitable. Preferably, the total amount of comonomer, more preferably ethylene, in the propylene copolymer is up to 10 mol %, more preferably up to 8 mol %, and even more preferably up to 6 mol %.

In a preferred embodiment, the polypropylene is a propylene copolymer comprising a polypropylene matrix and an ethylene-propylene rubber (EPR).

The polypropylene matrix can be a homopolymer or a copolymer, more preferably multimodal, i.e. bimodal, homopolymer or a multimodal, i.e. bimodal, copolymer. In case the polypropylene matrix is a propylene copolymer, then it is preferred that the comonomer is ethylene or butene. However, also other comonomers known in the art are suitable. The preferred amount of comonomer, more preferably ethylene, in the polypropylene matrix is up to 8.00 mol %. In case the propylene copolymer matrix has ethylene as the comonomer component, it is in particular preferred that the amount of ethylene in the matrix is up to 8.00 mol %, more preferably less than 6.00 mol %. In case the propylene copolymer matrix has butene as the comonomer component, it is in particular preferred that the amount of butene in the matrix is up to 6.00 Mol %, more preferably less than 4.00 mol %.

Preferably, the ethylene-propylene rubber (EPR) in the total propylene copolymer is 50 wt % or less, more preferably 40 wt % or less. More preferably the amount of ethylene-propylene rubber (EPR) in the total propylene copolymer is in the range of 10 to 50 wt %, still more preferably in the range of 10 to 40 wt %.

In addition, it is preferred that the polypropylene component of the foam as defined above is produced in the presence of a specific catalyst. Furthermore, for the production of the polypropylene of the inventive foam, the process as stated below is preferably used.

The polypropylene component of the inventive foam is obtainable by a new catalyst system. This new catalyst system comprises an asymmetric catalyst, whereby the catalyst system has a porosity of less than 1.40 ml/g, more preferably less than 1.30 ml/g and most preferably less than 1.00 ml/g. The porosity has been measured according to DIN 66135 ($N_2$). In another preferred embodiment the porosity is not detectable when determined with the method applied according to DIN 66135 ($N_2$).

An asymmetric catalyst according to the present technology is a metallocene compound comprising at least two organic ligands which differ in their chemical structure. More preferably the asymmetric catalyst according to the present technology is a metallocene compound comprising at least two organic ligands which differ in their chemical structure and the metallocene compound is free of $C_2$-symmetry and/or any higher symmetry. Preferably the asymmetric metallocene compound comprises only two different organic ligands, still more preferably comprises only two organic ligands which are different and linked via a bridge.

Said asymmetric catalyst is preferably a single site catalyst (SSC).

Due to the use of the catalyst system with a very low porosity comprising an asymmetric catalyst the manufacture of the above defined multi-branched polypropylene is possible.

Furthermore it is preferred, that the catalyst system has a surface area of less than 25 $m^2/g$, yet more preferred less than 20 $m^2/g$, still more preferred less than 15 $m^2/g$, yet still less than 10 $m^2/g$ and most preferred less than 5 $m^2/g$. The surface area according to the present technology is measured according to ISO 9277 ($N_2$).

It is in particular preferred that the catalytic system according to the present technology comprises an asymmetric catalyst, i.e. a catalyst as defined below, and has porosity not detectable when applying the method according to DIN 66135 ($N_2$) and has a surface area measured according to ISO 9277 ($N_2$) less than 5 $m^2/g$.

Preferably the asymmetric catalyst compound, i.e. the asymmetric metallocene, has the formula (I):

$$(CP)_2R_zMX_2 \qquad (I)$$

wherein z is 0 or 1,

M is Zr, Hf or Ti, more preferably Zr, and

X is independently a monovalent anionic ligand, such as σ-ligand,

R is a bridging group linking the two Cp ligands,

Cp is an organic ligand selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are selected from the above stated group and both Cp-ligands have a different chemical structure.

The term "σ-ligand" is understood in the whole description in a known manner, i.e. a group bonded to the metal at one or more places via a sigma bond. A preferred monovalent anionic ligand is halogen, in particular chlorine (Cl).

Preferably, the asymmetric catalyst is of formula (I) indicated above, wherein

M is Zr and each X is Cl.

Preferably both Cp-ligands are substituted.

Preferably both Cp-ligands have different residues to obtain an asymmetric structure.

Preferably, both Cp-ligands are selected from the group consisting of substituted cyclopenadienyl-ring, substituted indenyl-ring, substituted tetrahydroindenyl-ring, and substituted fluorenyl-ring wherein the Cp-ligands differ in the substituents bonded to the rings.

The optional one or more substituent(s) bonded to cyclopenadienyl, indenyl, tetrahydroindenyl, or fluorenyl may be independently selected from a group including halogen, hydrocarbyl (e.g. $C_1$-$C_{20}$-alkyl, $C_2$-$C_{20}$-alkenyl, $C_2$-$C_{20}$-alkynyl, $C_3$-$C_{12}$-cycloalkyl, $C_6$-$C_{20}$-aryl or $C_7$-$C_{20}$-arylalkyl), $C_3$-$C_{12}$-cycloalkyl which contains 1, 2, 3 or 4 heteroatom(s) in the ring moiety, $C_6$-$C_{20}$-heteroaryl, $C_1$-$C_{20}$-haloalkyl, —SiR"$_3$, —OSiR"$_3$, —SR", —PR"$_2$ and —NR"$_2$, wherein each R" is independently a hydrogen or hydrocarbyl, e.g. $C_1$-$C_{20}$-alkyl, $C_2$-$C_{20}$-alkenyl, $C_2$-$C_{20}$-alkynyl, $C_3$-$C_{12}$-cycloalkyl or $C_6$-$C_{20}$-aryl.

More preferably both Cp-ligands are indenyl moieties wherein each indenyl moiety bears one or two substituents as defined above. More preferably each Cp-ligand is an indenyl moiety bearing two substituents as defined above, with the proviso that the substituents are chosen in such a manner that both Cp-ligands are of different chemical structure, i.e both Cp-ligands differ at least in one substituent bonded to the indenyl moiety, in particular differ in the substituent bonded to the five membered ring of the indenyl moiety.

Still more preferably both Cp are indenyl moieties wherein the indenyl moieties comprise at least at the five membered ring of the indenyl moiety, more preferably at 2-position, a substituent selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, with proviso that the indenyl moieties of both Cp must chemically differ from each other, i.e. the indenyl moieties of both Cp comprise different substituents.

Still more preferred both Cp are indenyl moieties wherein the indenyl moieties comprise at least at the six membered ring of the indenyl moiety, more preferably at 4-position, a substituent selected from the group consisting of a $C_6$-$C_{20}$ aromatic ring moiety, such as phenyl or naphthyl, preferably phenyl, which is optionally substituted with one or more substitutents, such as $C_1$-$C_6$ alkyl, and a heteroaromatic ring moiety, with the proviso that the indenyl moieties of both Cp must chemically differ from each other, i.e. the indenyl moieties of both Cp comprise different substituents.

Yet more preferably both Cp are indenyl moieties wherein the indenyl moieties comprise at the five membered ring of the indenyl moiety, more preferably at the 2-position, a substituent and at the six membered ring of the indenyl moiety, more preferably at the 4-position, a further substituent, wherein the substituent of the five membered ring is selected from the group consisting of alkyl, such as $C_1$-$C_6$ alkyl, e.g. methyl, ethyl, isopropyl, and trialkyloxysiloxy, wherein each alkyl is independently selected from $C_1$-$C_6$ alkyl, such as methyl or ethyl, and the further substituent of the six membered ring is selected from the group consisting of a $C_6$-$C_{20}$ aromatic ring moiety, such as phenyl or naphthyl, preferably phenyl, which is optionally substituted with one or more substituents, such as $C_1$-$C_6$ alkyl, and a heteroaromatic ring moiety, with proviso that the indenyl moieties of both Cp must chemically differ from each other, i.e. the indenyl moieties of both Cp comprise different substituents. It is in particular preferred that both Cp are idenyl rings comprising two substituents each and differ in the substituents bonded to the five membered ring of the idenyl rings.

Concerning the moiety "R" it is preferred that "R" has the formula (II)

—Y(R')$_2$—                      (II)

wherein

Y is C, Si or Ge, and

R' is $C_1$ to $C_{20}$ alkyl, $C_6$-$C_{12}$ aryl, or $C_7$-$C_{12}$ arylalkyl or trimethylsilyl.

In case both Cp-ligands of the asymmetric catalyst as defined above, in particular case of two indenyl moieties, are linked with a bridge member R, the bridge member R is typically placed at the 1-position. The bridge member R may contain one or more bridge atoms selected from e.g. C, Si and/or Ge, preferably from C and/or Si. One preferable bridge R is —Si(R')$_2$—, wherein R' is selected independently from one or more of e.g. trimethylsilyl, $C_1$-$C_{10}$ alkyl, $C_1$-$C_{20}$ alkyl, such as $C_6$-$C_{12}$ aryl, or $C_7$-$C_{40}$, such as $C_7$-$C_{12}$ arylalkyl, wherein alkyl as such or as part of arylalkyl is preferably $C_1$-$C_6$ alkyl, such as ethyl or methyl, preferably methyl, and aryl is preferably phenyl. The bridge —Si(R')$_2$— is preferably e.g. —Si($C_1$-$C_6$ alkyl)$_2$-, —Si(phenyl)$_2$- or —Si($C_1$-$C_6$ alkyl)(phenyl)-, such as —Si(Me)$_2$-.

In a preferred embodiment the asymmetric catalyst, i.e. the asymmetric metallocene, is defined by the formula (III)

(Cp)$_2$R$_1$ZrCl$_2$                      (III)

wherein both Cp coordinate to M and are selected from the group consisting of unsubstituted cyclopenadienyl, unsubstituted indenyl, unsubstituted tetrahydroindenyl, unsubstituted fluorenyl, substituted cyclopenadienyl, substituted indenyl, substituted tetrahydroindenyl, and substituted fluorenyl, with the proviso that both Cp-ligands are of different chemical structure, and R is a bridging group linking two ligands Cp, wherein R is defined by the formula (II)

—Y(R')$_2$—                      (II)

wherein

Y is C, Si or Ge, and

R' is $C_1$ to $C_{20}$ alkyl, $C_6$-$C_{12}$ aryl, or $C_7$-$C_{12}$ arylalkyl.

More preferably the asymmetric catalyst is defined by the formula (III), wherein both Cp are selected from the group consisting of substituted cyclopenadienyl, substituted indenyl, substituted tetrahydroindenyl, and substituted fluorenyl.

Yet more preferably the asymmetric catalyst is defined by the formula (III), wherein both Cp are selected from the group consisting of substituted cyclopenadienyl, substituted indenyl, substituted tetrahydroindenyl, and substituted fluorenyl with the proviso that both Cp-ligands differ in the substituents, i.e. the substituents as defined above, bonded to cyclopenadienyl, indenyl, tetrahydroindenyl, or fluorenyl.

Still more preferably the asymmetric catalyst is defined by the formula (III), wherein both Cp are indenyl and both indenyl differ in one substituent, i.e. in a substituent as defined above bonded to the five member ring of indenyl.

It is in particular preferred that the asymmetric catalyst is a non-silica supported catalyst as defined above, in particular a metallocene catalyst as defined above.

In a preferred embodiment the asymmetric catalyst is dimethylsilyl [(2-methyl-(4'-tert.butyl)-4-phenyl-indenyl)(2-isopropyl-(4'-tert.butyl)-4-phenyl-indenyl)]zirconium dichloride (IUPAC: dimethylsilandiyl [(2-methyl-(4'-tert.butyl)-4-phenyl-indenyl)(2-isopropyl-(4'-tert.butyl)-4-phenyl-indenyl)]zirconium dichloride). More preferred said asymmetric catalyst is not silica supported.

The above described asymmetric catalyst components are prepared according to the methods described in WO 01/48034.

It is in particular preferred that the asymmetric catalyst system is obtained by the emulsion solidification technology as described in WO 03/051934. This document is herewith incorporated in its entirety by reference. Hence the asymmetric catalyst is preferably in the form of solid catalyst particles, obtainable by a process comprising the steps of a) preparing a solution of one or more asymmetric catalyst components;

b) dispersing said solution in a solvent immiscible therewith to form an emulsion in which said one or more catalyst components are present in the droplets of the dispersed phase, c) solidifying said dispersed phase to convert said droplets to solid particles and optionally recovering said particles to obtain said catalyst.

Preferably a solvent, more preferably an organic solvent, is used to form said solution. Still more preferably the organic solvent is selected from the group consisting of a linear alkane, cyclic alkane, linear alkene, cyclic alkene, aromatic hydrocarbon and halogen-containing hydrocarbon.

Moreover the immiscible solvent forming the continuous phase is an inert solvent, more preferably the immiscible solvent comprises a fluorinated organic solvent and/or a functionalized derivative thereof, still more preferably the immiscible solvent comprises a semi-, highly- or perfluorinated hydrocarbon and/or a functionalized derivative thereof. It is in particular preferred, that said immiscible solvent comprises a perfluorohydrocarbon or a functionalized derivative thereof, preferably $C_3$-$C_{30}$ perfluoroalkanes, -alkenes or -cycloalkanes, more preferred $C_4$-$C_{10}$ perfluoro-alkanes, -alkenes or -cycloalkanes, particularly preferred perfluorohexane, perfluoroheptane, perfluorooctane or perfluoro(methylcyclohexane) or a mixture thereof.

Furthermore it is preferred that the emulsion comprising said continuous phase and said dispersed phase is a bi- or multiphasic system as known in the art. An emulsifier may be used for forming the emulsion. After the formation of the emulsion system, said catalyst is formed in situ from catalyst components in said solution.

In principle, the emulsifying agent may be any suitable agent which contributes to the formation and/or stabilization of the emulsion and which does not have any adverse effect on the catalytic activity of the catalyst. The emulsifying agent may e.g. be a surfactant based on hydrocarbons optionally interrupted with (a) heteroatom(s), preferably halogenated hydrocarbons optionally having a functional group, preferably semi-, highly- or perfluorinated hydrocarbons as known in the art. Alternatively, the emulsifying agent may be prepared during the emulsion preparation, e.g. by reacting a surfactant precursor with a compound of the catalyst solution. Said surfactant precursor may be a halogenated hydrocarbon with at least one functional group, e.g. a highly fluorinated $C_1$ to $C_{30}$ alcohol, which reacts e.g. with a cocatalyst component, such as aluminoxane.

In principle any solidification method can be used for forming the solid particles from the dispersed droplets. According to one preferable embodiment the solidification is effected by a temperature change treatment. Hence the emulsion is subjected to a gradual temperature change of up to 10° C./min, preferably 0.5 to 6° C./min and more preferably 1 to 5° C./min. Even more preferred the emulsion is subjected to a temperature change of more than 40° C., preferably more than 50° C. within less than 10 seconds, preferably less than 6 seconds.

The recovered particles have preferably an average size range of 5 to 200 μm, more preferably 10 to 100 μm.

Moreover, the form of solidified particles have preferably a spherical shape, a predetermined particles size distribution and a surface area as mentioned above of preferably less than 25 $m^2$/g, still more preferably less than 20 $m^2$/g, yet more preferably less than 15 $m^2$/g, yet still more preferably less than 10 $m^2$/g and most preferably less than 5 $m^2$/g, wherein said particles are obtained by the process as described above.

For further details, embodiments and examples of the continuous and dispersed phase system, emulsion formation method, emulsifying agent and solidification methods reference is made e.g. to the above cited international patent application WO 03/051934.

As mentioned above the catalyst system may further comprise an activator as a cocatalyst, as described in WO 03/051934, which is incorporated herein with reference.

Preferred as cocatalysts for metallocenes and non-metallocenes, if desired, are the aluminoxanes, in particular the $C_1$-$C_{10}$-alkylaluminoxanes, most particularly methylaluminoxane (MAO). Such aluminoxanes can be used as the sole cocatalyst or together with other cocatalyst(s). Thus besides or in addition to aluminoxanes, other cation complex forming catalysts activators can be used. Said activators are commercially available or can be prepared according to the prior art literature.

Further aluminoxane cocatalysts are described e.g. in WO 94/28034 which is incorporated herein by reference. These are linear or cyclic oligomers of having up to 40, preferably 3 to 20, —(Al(R''')O)— repeat units (wherein R''' is hydrogen, $C_1$-$C_{10}$-alkyl (preferably methyl) or $C_6$-$C_{18}$-aryl or mixtures thereof).

The use and amounts of such activators are within the skills of an expert in the field. As an example, with the boron activators, 5:1 to 1:5, preferably 2:1 to 1:2, such as 1:1, ratio of the transition metal to boron activator may be used. In case of preferred aluminoxanes, such as methylaluminumoxane (MAO), the amount of Al, provided by aluminoxane, can be chosen to provide a molar ratio of Al:transition metal e.g. in the range of 1 to 10,000, suitably 5 to 8000, preferably 10 to 7000, e.g. 100 to 4000, such as 1000 to 3000. Typically in the case of solid (heterogeneous) catalyst the ratio is preferably below 500.

The quantity of cocatalyst to be employed in the catalyst of the present technology is thus variable, and depends on the conditions and the particular transition metal compound chosen in a manner well known to a person skilled in the art.

Any additional components to be contained in the solution comprising the organotransition compound may be added to said solution before or, alternatively, after the dispersing step.

Furthermore, it is preferred that the process temperature is higher than 60° C. Preferably, the process is a multi-stage process to obtain multimodal polypropylene as defined above.

Multistage processes include also bulk/gas phase reactors known as multizone gas phase reactors for producing multimodal propylene polymer.

A preferred multistage process is a "loop-gas phase"-process, such as developed by Borealis A/S, Denmark (known as BORSTAR® technology) described e.g. in patent literature, such as in EP 0 887 379 or in WO 92/12182.

Multimodal polymers can be produced according to several processes which are described, e.g. in WO 92/12182, EP 0 887 379 and WO 97/22633.

A multimodal polypropylene used for the preparation of the inventive foam is preferably produced in a multi-stage process as described in WO 92/12182. The content of this document is incorporated herein by reference.

It has previously been known to produce multimodal, in particular bimodal, polypropylene in two or more reactors connected in series, i.e. in different steps (a) and (b).

According to the present technology, the main polymerization stages are preferably carried out as a combination of a bulk polymerization/gas phase polymerization.

The bulk polymerizations are preferably performed in a so-called loop reactor.

In order to produce the multimodal polypropylene component of the foam according to the present technology, a flexible mode is preferred. For this reason, it is preferred that the composition be produced in two main polymerization stages in a combination of loop reactor/gas phase reactor.

Optionally, and preferably, the process may also comprise a prepolymerization step in a manner known in the field and which may precede the polymerization step (a).

If desired, a further elastomeric comonomer component, so called ethylene-propylene rubber (EPR) component as defined in the present technology, may be incorporated into the obtained propylene polymer to form a propylene copolymer as defined above. The ethylene-propylene rubber (EPR) component may preferably be produced after the gas phase polymerization step (b) in a subsequent second or further gas phase polymerizations using one or more gas phase reactors.

The process is preferably a continuous process.

Preferably, in the process for producing the propylene polymer as defined above the conditions for the bulk reactor of step (a) may be as follows:

the temperature is within the range of 40° C. to 110° C., preferably between 60° C. and 100° C., 70 to 90° C.,
the pressure is within the range of 20 bar to 80 bar, preferably between 30 bar to 60 bar,
hydrogen can be added for controlling the molar mass in a manner known per se.

Subsequently, the reaction mixture from the bulk (bulk) reactor (step a) is transferred to the gas phase reactor, i.e. to step (b), whereby the conditions in step (b) are preferably as follows:

the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The residence time can vary in both reactor zones. In one embodiment of the process for producing the propylene polymer the residence time in the bulk reactor, e.g. loop is in the range 0.5 to 5 hours, e.g. 0.5 to 2 hours and the residence time in the gas phase reactor will generally be 1 to 8 hours.

If desired, the polymerization may be effected in a known manner under supercritical conditions in the bulk, preferably loop reactor, and/or as a condensed mode in the gas phase reactor.

The process of the present technology or any embodiments thereof above enable highly feasible means for producing and further tailoring the propylene polymer composition within the present technology, e.g. the properties of the polymer composition can be adjusted or controlled in a known manner e.g. with one or more of the following process parameters: temperature, hydrogen feed, comonomer feed, propylene feed e.g. in the gas phase reactor, catalyst, the type and amount of an external donor (if used), split between components.

The above process enables very feasible means for obtaining the reactor-made propylene polymer as defined above.

Furthermore, the present technology also relates to a process for the preparation of the foam as defined above, wherein a multi-branched polypropylene as defined above is subjected to foaming. In such process, a melt of the multi-branched polypropylene comprising a gaseous foaming agent such as butane, HFC or $CO_2$ is suddenly expanded through a pressure drop.

Continuous foaming processes as well as discontinuous processes may be applied.

In a continuous foaming process, the polymer is melted and laden with gas in an extruder under pressures typically above 20 bar before extruded through a die where the pressure drop causes the formation of a foam. The mechanism of foaming polypropylene in foam extrusion is explained, for example, in H. E. Naguib, C. B. Park, N. Reichelt, Fundamental foaming mechanisms governing the volume expansion of extruded polypropylene foams, Journal of Applied Polymer Science, 91, 2661-2668 (2004). Processes for foaming are outlined in S. T. Lee, Foam Extrusion, Technomic Publishing (2000).

In a discontinuous foaming process, the polymer (micro-) pellets are laden with foaming agent under pressure and heated below melting temperature before the pressure in the autoclave is suddenly relaxed. The dissolved foaming agent forms bubbles and creates a foam structure. Such preparation of discontinuously foamed beads is described for example in DE 3 539 352.

The present technology also relates to the use of the multi-branched polypropylene as defined above for the preparation of foams.

The present technology will now be described in further detail by the following examples.

EXAMPLES

1. Definitions/Measuring Methods

The following definitions of terms and determination methods apply for the above general description of the present technology as well as to the below examples unless otherwise defined.

A. Pentad Concentration

For the meso pentad concentration analysis, also referred herein as pentad concentration analysis, the assignment analysis is undertaken according to T Hayashi, Pentad concentration, R. Chujo and T. Asakura, Polymer 29 138-43 (1988) and Chujo R, et al., Polymer 35 339 (1994)

B. Multi-Branching Index

1. Acquiring the Experimental Data

Polymer is melted at T=180° C. and stretched with the SER Universal Testing Platform as described below at deformation rates of $d\epsilon/dt = 0.1\ 0.3\ 1.0\ 3.0$ and $10\ s^{-1}$ in subsequent experiments. The method to acquire the raw data is described in Sentmanat et al., J. Rheol. 2005, Measuring the Transient Elongational Rheology of Polyethylene Melts Using the SER Universal Testing Platform.

Experimental Setup

A Paar Physica MCR300, equipped with a TC30 temperature control unit and an oven CTT600 (convection and radiation heating) and a SERVP01-025 extensional device with temperature sensor and a software RHEOPLUS/32 v2.66 is used.

Sample Preparation

Stabilized Pellets are compression moulded at 220° C. (gel time 3 min, pressure time 3 min, total moulding time 3+3=6 min) in a mould at a pressure sufficient to avoid bubbles in the specimen, cooled to room temperature. From such prepared plate of 0.7 mm thickness, stripes of a width of 10 mm and a length of 18 mm are cut.

Check of the SER Device

Because of the low forces acting on samples stretched to thin thicknesses, any essential friction of the device would deteriorate the precision of the results and has to be avoided.

In order to make sure that the friction of the device is less than a threshold of $5 \times 10^{-3}$ mNm (Milli-Newtonmeter), which is required for precise and correct measurements, the following check procedure is performed prior to each measurement:

The device is set to test temperature (180° C.) for minimum 20 minutes without sample in presence of the clamps
A standard test with 0.3 s$^{-1}$ is performed with the device on test temperature (180° C.)
The torque (measured in mNm) is recorded and plotted against time
The torque must not exceed a value of 5×10$^{-3}$ mNm to make sure that the friction of the device is in an acceptably low range Conducting the Experiment The device is heated for min. 20 min to the test temperature (180° C. measured with the thermocouple attached to the SER device) with clamps but without sample. Subsequently, the sample (0.7×10×18 mm), prepared as described above, is clamped into the hot device. The sample is allowed to melt for 2 minutes+/−20 seconds before the experiment is started.

During the stretching experiment under inert atmosphere (nitrogen) at constant Hencky strain rate, the torque is recorded as a function of time at isothermal conditions (measured and controlled with the thermocouple attached to the SER device).

After stretching, the device is opened and the stretched film (which is winded on the drums) is inspected. Homogenous extension is required. It can be judged visually from the shape of the stretched film on the drums if the sample stretching has been homogenous or not. The tape must be wound up symmetrically on both drums, but also symmetrically in the upper and lower half of the specimen.

If symmetrical stretching is confirmed hereby, the transient elongational viscosity calculates from the recorded torque as outlined below.

2. Evaluation

For each of the different strain rates dε/dt applied, the resulting tensile stress growth function $\eta_E^+$ (dε/dt, t) is plotted against the total Hencky strain ε to determine the strain hardening behaviour of the melt, see FIG. 1.

In the range of Hencky strains between 1.0 and 3.0, the tensile stress growth function $\eta_E^+$ can be well fitted with a function $$\eta_E^+(\dot{\epsilon},\epsilon)=c_1 \epsilon^{c_2}$$

where $c_1$ and $c_2$ are fitting variables. Such derived $c_2$ is a measure for the strain hardening behavior of the melt and called Strain Hardening Index SHI.

Dependent on the polymer architecture, SHI can be independent of the strain rate (linear materials, Y- or H-structures)
increase with strain rate (short chain-, hyper- or multi-branched structures).

Figure 2:
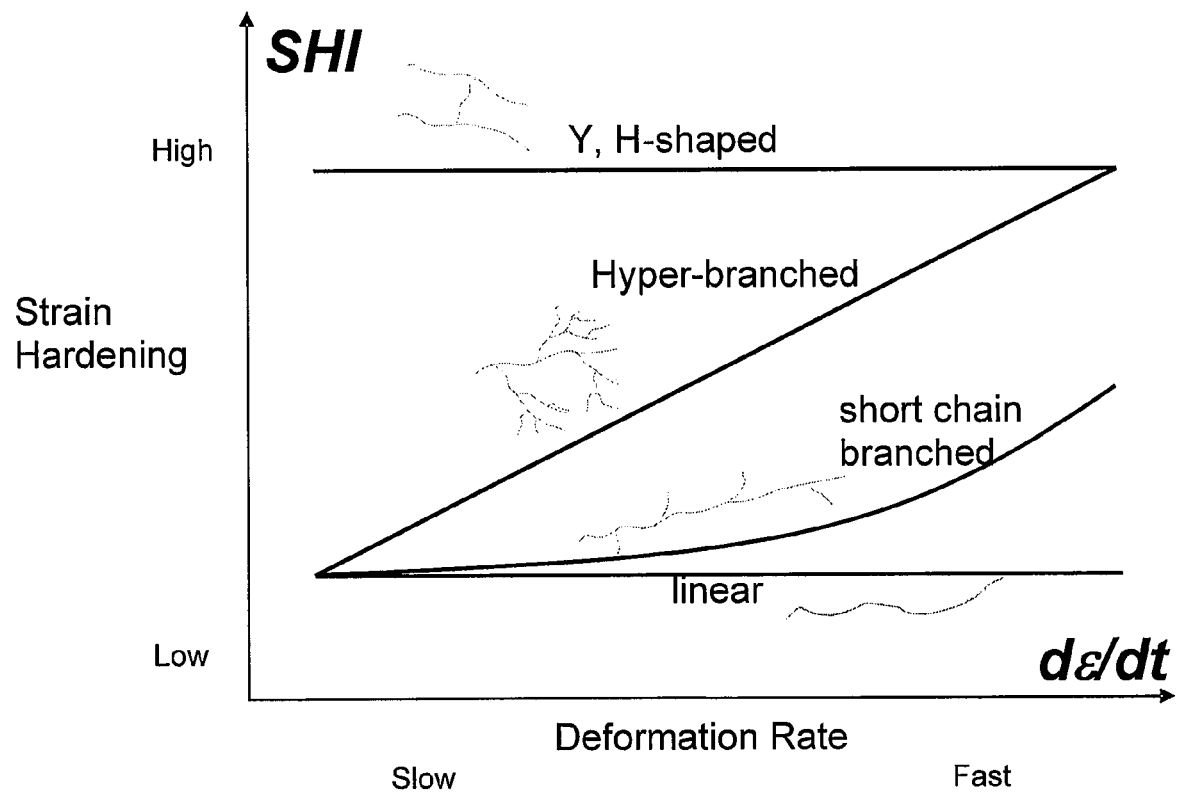
FIG. 2 is a graph depicting the deformation rate versus strain hardening.
Figure 3:
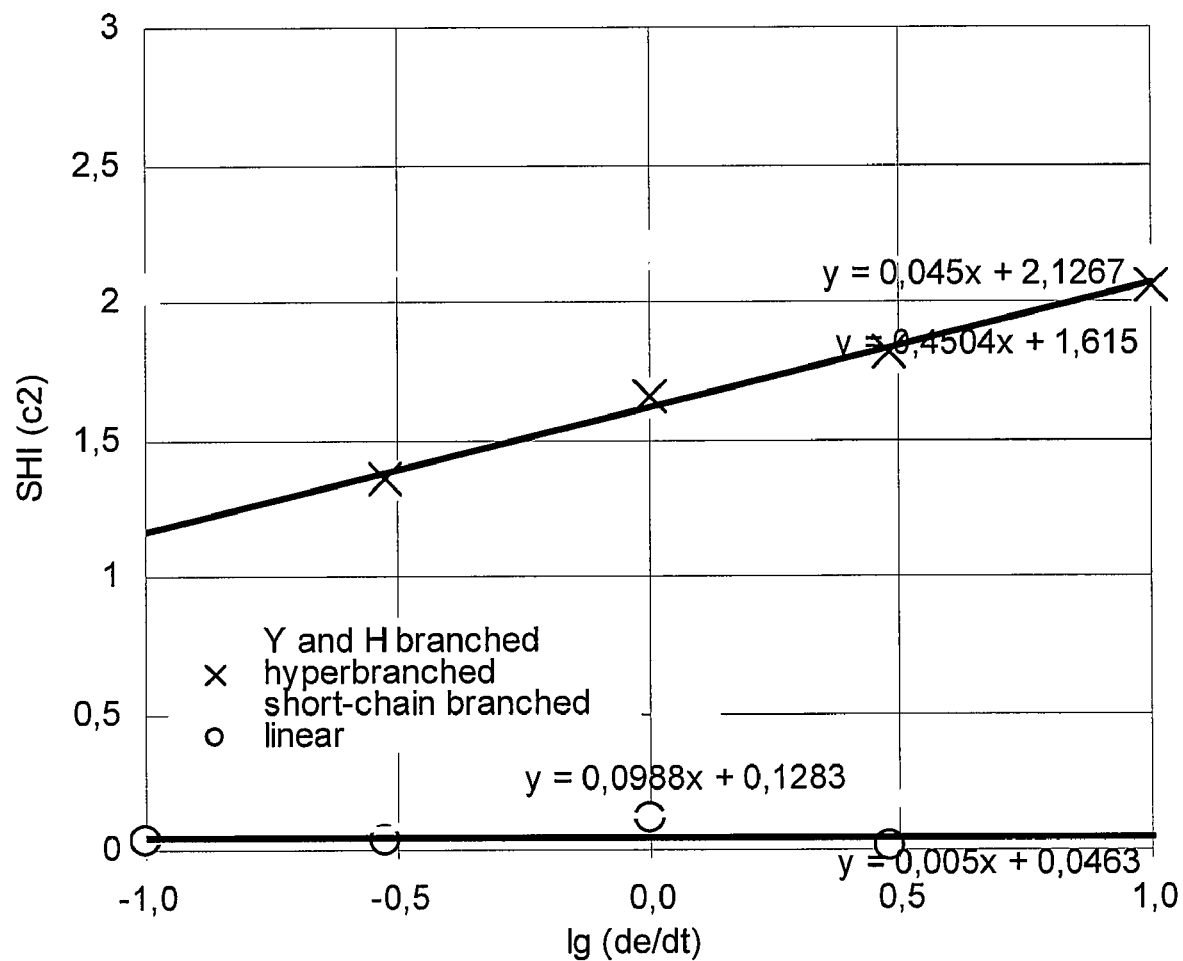
FIG. 3 is a graph depicting the deformation rate versus strain hardening for various examples.
Figure 4:
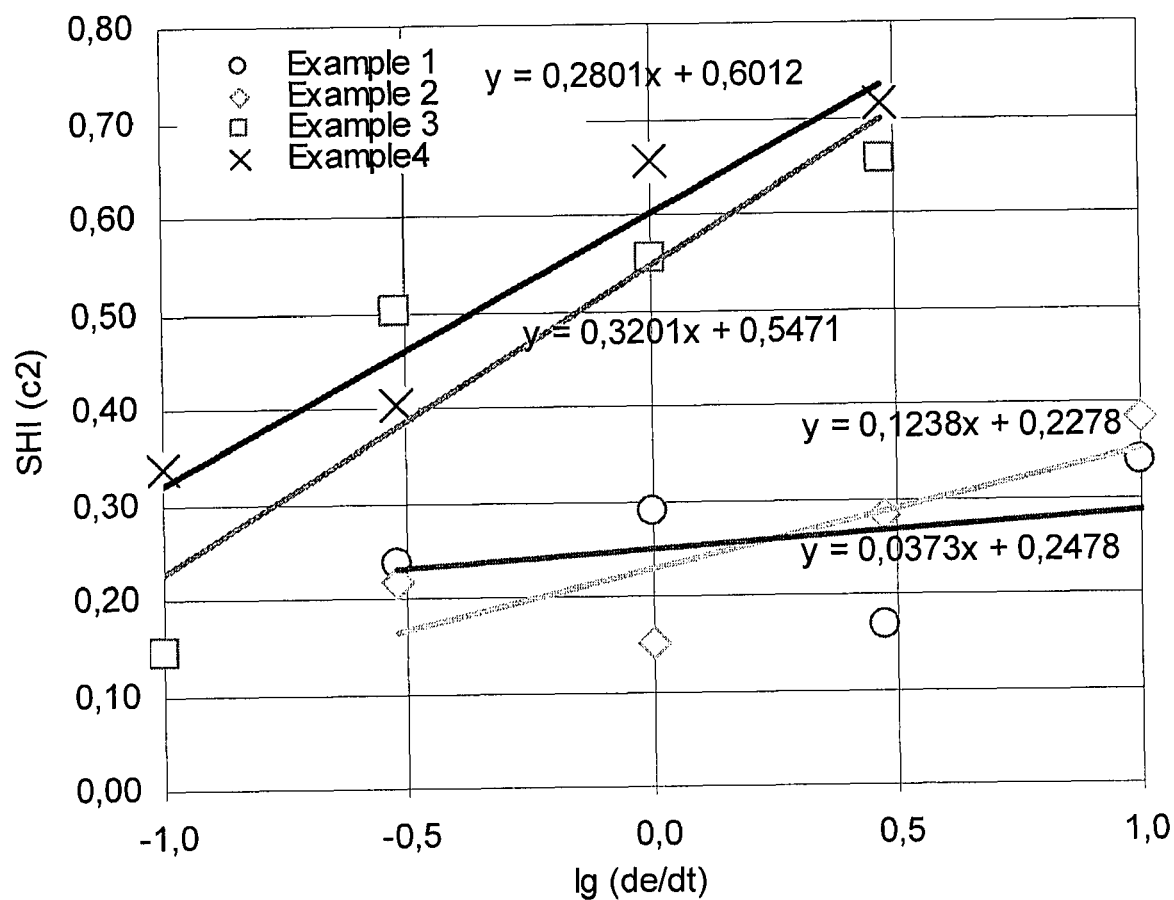
FIG. 4 is a graph depicting the deformation rate versus strain hardening for various examples.

This is illustrated in FIG. 2.

For polyethylene, linear (HDPE), short-chain branched (LLDPE) and hyperbranched structures (LDPE) are well known and hence they are used to illustrate the structural analytics based on the results on extensional viscosity. They are compared with a polypropylene with Y and H-structures with regard to their change of the strain-hardening behavior as a function of strain rate, see FIG. 2 and Table 1.

To illustrate the determination of SHI at different strain rates as well as the multi-branching index (MBI) four polymers of known chain architecture are examined with the analytical procedure described above.

The first polymer is a H- and Y-shaped polypropylene homopolymer made according to EP 879 830 ("A") example 1 through adjusting the MFR with the amount of butadiene. It has a MFR 230/2.16 of 2.0 g/10 min, a tensile modulus of 1950 MPa and a branching index g' of 0.7.

The second polymer is a commercial hyperbranched LDPE, Borealis "B", made in a high pressure process known in the art. It has a MFR 190/2.16 of 4.5 and a density of 923 kg/m$^3$.

The third polymer is a short chain branched LLDPE, Borealis "C", made in a low pressure process known in the art. It has a MFR 190/2.16 of 1.2 and a density of 919 kg/m$^3$.

The fourth polymer is a linear HDPE, Borealis "D", made in a low pressure process known in the art. It has a MFR 190/2.16 of 4.0 and a density of 954 kg/m$^3$.

The four materials of known chain architecture are investigated by means of measurement of the transient elongational viscosity at 180° C. at strain rates of 0.10, 0.30, 1.0, 3.0 and 10 s$^{-1}$. Obtained data (transient elongational viscosity versus Hencky strain) is fitted with a function $$\eta_E^+ = c_1 * \epsilon^{c_2}$$

for each of the mentioned strain rates. The parameters c1 and c2 are found through plotting the logarithm of the transient elongational viscosity against the logarithm of the Hencky strain and performing a linear fit of this data applying the least square method. The parameter c1 calculates from the intercept of the linear fit of the data log($\eta_E^+$) versus log(ε) from $$c_1 = 10^{Intercept}$$

and $c_2$ is the strain hardening index (SHI) at the particular strain rate.

This procedure is done for all five strain rates and hence, SHI@0.1 s$^{-1}$, SHI@0.3 s$^{-1}$, SHI@1.0 s$^{-1}$, SHI@3.0 s$^{-1}$, SHI@10 s$^{-1}$ are determined, see FIG. 1.

TABLE 1

SHI-values

| dε/dt | log (dε/dt) | Property | Y and H branched PP A | Hyper-branched LDPE B | short-chain branched LLDPE C | Linear HDPE D |
|---|---|---|---|---|---|---|
| 0.1 | −1.0 | SHI@0.1 s$^{-1}$ | 2.05 | — | 0.03 | 0.03 |
| 0.3 | −0.5 | SHI@0.3 s$^{-1}$ | — | 1.36 | 0.08 | 0.03 |
| 1 | 0.0 | SHI@1.0 s$^{-1}$ | 2.19 | 1.65 | 0.12 | 0.11 |
| 3 | 0.5 | SHI@3.0 s$^{-1}$ | — | 1.82 | 0.18 | 0.01 |
| 10 | 1.0 | SHI@10 s$^{-1}$ | 2.14 | 2.06 | — | — |

From the strain hardening behavior measured by the values of the SHI@1 s$^{-1}$ one can already clearly distinguish between two groups of polymers: Linear and short-chain branched have a SHI@1 s$^{-1}$ significantly smaller than 0.30. In contrast, the Y and H-branched as well as hyper-branched materials have a SHI@1 s$^{-1}$ significantly larger than 0.30.

In comparing the strain hardening index at those five strain rates $\dot{\epsilon}_H$ of 0.10, 0.30, 1.0, 3.0 and 10 s$^{-1}$, the slope of SHI as a function of the logarithm of 1H, log($\dot{\epsilon}_H$) is a characteristic measure for multi-branching. Therefore, a multi-branching index (MBI) is calculated from the slope of a linear fitting curve of SHI versus log($\dot{\epsilon}_H$):

$$SHI(\dot{\epsilon}_H) = c_3 + MBI*\log(\dot{\epsilon}_H)$$

The parameters c3 and MBI are found through plotting the SHI against the logarithm of the Hencky strain rate log($\dot{\epsilon}_H$) and performing a linear fit of this data applying the least square method. Please confer to FIG. 2.

TABLE 2

Multi-branched-index (MBI)

| Property | Y and H branched PP A | Hyper-branched LDPE B | short-chain branched LLDPE C | Linear HDPE D |
|---|---|---|---|---|
| MBI | 0.04 | 0.45 | 0.10 | 0.01 |

The multi-branching index MBI allows now to distinguish between Y or H-branched polymers which show a MBI smaller than 0.05 and hyper-branched polymers which show a MBI larger than 0.15. Further, it allows to distinguish between short-chain branched polymers with MBI larger than 0.10 and linear materials which have a MBI smaller than 0.10.

Similar results can be observed when comparing different polypropylenes, i.e. polypropylenes with rather high branched structures have higher SHI and MBI-values, respectively, compared to their linear counterparts. Similar to the hyper-branched polyethylenes the new developed polypropylenes show a high degree of branching. However the polypropylenes according to the instant technology are clearly distinguished in the SHI and MBI-values when compared to known hyper-branched polyethylenes. Without being bound on this theory, it is believed, that the different SHI and MBI-values are the result of a different branching architecture. For this reason the new found branched polypropylenes according to the present technology are designated as multi-branched.

Combining both, strain hardening index (SHI) and multi-branching index (MBI), the chain architecture can be assessed as indicated in Table 3:

TABLE 3

SHI and MBI

| Property | Y and H branched | Hyper-branched/ Multi-branched | short-chain branched | linear |
|---|---|---|---|---|
| SHI@1.0 s$^{-1}$ | >0.30 | >0.30 | ≦0.30 | ≦0.30 |
| MBI | ≦0.10 | >0.10 | ≦0.10 | 0.10 |

C. Further Measuring Methods

Particle size distribution: Particle size distribution is measured via Coulter Counter LS 200 at room temperature with n-heptane as medium.

NMR

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994).

The NMR-measurement was used for determining the mmmm pentad concentration in a manner well known in the art.

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

In detail: The number average molecular weight ($M_n$), the weight average molecular weight ($M_w$) and the molecular weight distribution (MWD) are measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11,500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The xylene solubles (XS, wt.-%): Analysis according to the known method: 2.0 g of polymer is dissolved in 250 ml p-xylene at 135° C. under agitation. After 30±2 minutes the solution is allowed to cool for 15 minutes at ambient temperature and then allowed to settle for 30 minutes at 25±0.5° C. The solution is filtered and evaporated in nitrogen flow and the residue dried under vacuum at 90° C. until constant weight is reached.

$XS\% = (100 \times m_1 \times v_0)/(m_0 \times v_1)$, wherein $m_0$=initial polymer amount (g)

$m_1$=weight of residue (g)

$v_0$=initial volume (ml)

$V_1$=volume of analyzed sample (ml)

Hot Xylene Insolubles (wt %):

Circa 2 g of the polymer ($m_p$) are weighted and put in a mesh of metal which is weighted ($m_{p+m}$). The polymer in the mesh is extracted in a soxhlet apparatus with boiling xylene for two days. Subsequently, the mesh is dried and weighted again ($m_{XHU+m}$). The mass of the xylene hot unsolubles $m_m - m_{XHU+m} = m_{XHU}$ is put in relation to the weight of the polymer to obtain the fraction of xylene insolubles $m_{XHU}/m_p$.

Melting temperature Tm, crystallization temperature Tc, and the degree of crystallinity: measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-3.

Stiffness Film TD (transversal direction), Stiffness Film MD (machine direction), Elongation at break TD and Elongation at break MD: these are determined according to ISO527-3 (cross head speed: 1 mm/min).

Melt strength and melt extensibility by Rheotens measurement: The strain hardening behaviour of polymers is analysed by a Rheotens apparatus (product of Göttfert, Siemensstr. 2, 74711 Buchen, Germany) in which a melt strand is elongated by drawing down with a defined acceleration. The haul-off force F in dependence of draw-down velocity v is recorded.

The test procedure is performed in a standard climatized room with controlled room temperature of T=23° C. The Rheotens apparatus is combined with an extruder/melt pump for continuous feeding of the melt strand. The extrusion temperature is 200° C.; a capillary die with a diameter of 2 mm and a length of 6 mm is used and the acceleration of the melt strand drawn down is 120 nm/s$^2$. The maximum points ($F_{max}$; $v_{max}$) at failure of the strand are characteristic for the strength and the drawability of the melt.

Haze and transparency: are determined according to ASTM D1003-92 (haze).

Intrinsic viscosity: is measured according to DIN ISO 1628/1, October 1999 (in Decalin at 135° C.).
Porosity: is measured according to DIN 66135
Surface area: is measured according to ISO 9277

3. Examples

Example 1

A support-free catalyst has been prepared as described in example 5 of WO 03/051934 whilst using an asymmetric metallocene dimethylsilyl [(2-methyl-(4'-tert.butyl)-4-phenyl-indenyl)(2-isopropyl-(4'-tert.butyl)-4-phenyl-indenyl)] zirconium dichloride.

Such catalyst has been used to polymerize a polypropylene copolymer with 4 mol % ethylene in the Borstar process, known in the art.

The material properties of the polymer are shown in Table 4.

Comparative Example 1

Linear Bimodal

A bimodal polypropylene copolymer has been prepared using a Z/N catalyst and the Borstar process.

Comparative Example 2

Y/H-Shaped Polymer

A Y/H shaped polymer has been prepared according to EP 0 887 379 to obtain a polypropylene copolymer of $MFR_{230/2.16}$ 2.2 g/10 min and a branching index g' of 0.8.

The properties of the polymers are summarized in Table 4.

All materials have been pelletized together with additives, i.e. 1000 ppm of a commercial stabilizer Irganox B215 (supplied by Ciba), using an extruder at melt temperature of 240° C.

The pelletized samples have been used for foam extrusion.

In a corotating 25 mm twin screw extruder (Berstorff ZE25, L/D 39.5), the following temperature settings are adjusted (Table 5):

In the second zone the pellets are melted before the foaming agent $CO_2$ is dosed into the melt (zone 3) with a constant feed of 54 g/hr through a feeder Bronkhorst F-201AC-FB-22-V at a pressure of 20 bar.

Such gas laden melt is homogenized and cooled before it exits the flat die attached to the extruder. Immediately after the die, the foam expands and it is collected with a standard cast-film windup equipment.

Foamed sheets are cut from the film and investigated for their mechanical properties.

The foaming process parameters and the foam properties are summarized in Table 5.

TABLE 5

Preparation and characterization of the foam

| | Unit | Example 1 | Comp. Ex. 1 | Comp. Ex. 2 |
|---|---|---|---|---|
| Type of polypropylene | | Multi-branched | linear | Y/H-shaped |
| Throughput | kg/hr | 10 | 10 | 10 |
| Temperature Settings | ° C. | 30° C./210° C./210° C./160° C./160° C./160° C./160° C./150° C./150° C./150° C./150° C./150° C./170° C./170° C. | | |
| Screw Speed | rpm | 175 | 175 | 175 |
| Melt temp. | ° C. | 170 | 170 | 170 |

TABLE 4

Material Properties of the polypropylenes

| | Unit | Method | E1 (MC) | CE1 (ZN) | CE2 (Y/H) |
|---|---|---|---|---|---|
| $MFR_{230/2.1}$ | g/10 min | MFR | 4 | 1.9 | 2.2 |
| g' | — | IV | 0.7 | 1.0 | 0.8 |
| SHI@0.1 | — | SER | 0.75 | — | 1.77 |
| SHI@0.3 | — | SER | 0.85 | — | 1.60 |
| SHI@1.0 | — | SER | 1.00 | — | 1.90 |
| SHI@3.0 | — | SER | 0.96 | — | 1.96 |
| SHI@10 | — | SER | — | — | 1.79 |
| MBI | — | SER | 0.16 | — | 0.08 |
| Structure | — | SER | mb | lin | Y/H |
| C2 | mol % | IR | 4 | 6.5 | 6.0 |
| XS | wt % | XS | 0.7 | 7.8 | 6.9 |
| Hot xylene insolubles | wt % | | <0.05 | <0.05 | 0.38 |
| Mw | kg/mol | GPC | 319 | 539 | 427 |
| Mn | kg/mol | GPC | 124 | 125 | 100 |
| F30 | cN | Rheotens | 10 | 12 | 27 |
| v30 | mm/s | Rheotens | 180 | 125 | 197 |
| Tm1 | ° C. | DSC | 130.8 | 138.0 | 128.7 |
| Hm1 | J/g | DSC | 60.3 | 75.3 | 1.1 |
| Tm2 | ° C. | DSC | 140.8 | — | 144.7 |
| Hm2 | J/g | DSC | 30.2 | — | 76.8 |
| Tc | ° C. | DSC | 106.2 | 92.7 | 110.3 |
| Hc | J/g | DSC | 81.8 | 71.7 | 75.2 |
| Tensile Modulus | MPa | ISO527-2 | 1146.7 | 756.2 | 873.1 |
| Tensile Stress At Yield | MPa | ISO527-2 | 30.6 | 23.8 | 26.8 |
| Tensile Strain At Yield | % | ISO527-2 | 9.9 | 13.5 | 13.8 |
| Tensile Strength | MPa | ISO527-2 | 33.5 | 27.2 | 31.7 |
| Tensile Strain At Tensile Strength | % | ISO527-2 | 488.48 | 459.81 | 582.51 |
| Tensile Stress At Break | MPa | ISO527-2 | 33.1 | 26.7 | 31.6 |
| Tensile Strain At Break | % | ISO527-2 | 493.21 | 462.82 | 586.58 |

TABLE 5-continued

Preparation and characterization of the foam

| | Unit | Example 1 | Comp. Ex. 1 | Comp. Ex. 2 |
|---|---|---|---|---|
| Melt pressure | bar | 61 | 103 | 76 |
| Foaming agent | % $CO_2$ | 0.54 | 0.54 | 0.54 |
| Foam Density | $Kg/m^3$ | 480 | 690 | 360 |
| Cell size | μm | 320 | 1230 | 530 |
| Foam surface | +: high quality<br>−: low quality | + | + | − |
| Tensile modulus (MD/TD) | MPa | 329/186 | 648/500 | 295/148 |
| Elongation at break (MD/TD) | % | 39.7/28.9 | 16.8/8.1 | 14.0/10.4 |

The results of Table 5 indicate that the use of a multi-branched polypropylene as defined above enables extrusion at lower melt pressure and results in a foam of high surface quality and small cell size. Furthermore, if compared to the linear bimodal (Comp. Ex. 1) and the Y/H-shaped (Comp. Ex. 2) polypropylene, the elongation at break could be increased due to an improved homogeneity of the foam material.

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. A foam comprising a polypropylene material, wherein said polypropylene material is produced in the presence of a metallocene catalyst, and wherein at least one of said foam and said polypropylene have:
   a) a branching index g' of less than 1.00; and
   b) a strain hardening index of at least 0.30 measured by a deformation rate of 1.00 $s^{-1}$ at a temperature of 180° C., wherein the strain hardening index is defined as a slope of a logarithm to the basis 10 of a tensile stress growth function as a function of a logarithm to the basis 10 of a Hencky strain in the range of Hencky strains between 1 and 3.

2. The foam of claim 1, wherein at least one of the foam and the polypropylene material have a multi-branching index of at least 0.15, wherein the multi-branching index is defined as a slope of the strain hardening index as a function of a logarithm to the basis 10 of the Hencky strain rate.

3. The foam of claim 1, wherein the polypropylene material has an amount of hot xylene insolubles of less than 0.10 percent by weight.

4. The foam of claim 1, wherein the polypropylene material has an amount of xylene solubles of less than 2.0 wt %.

5. The foam of claim 1, wherein the polypropylene material has a melt flow rate in the range of 0.01 g/10 min to 1000.00 g/10 min, measured at 230° C.

6. The foam of claim 1, wherein the polypropylene material has an mmmm pentad concentration of higher than 90%.

7. The foam of claim 1, wherein the polypropylene material has a meso pentad concentration of higher than 90%.

8. The foam of claim 1, wherein the polypropylene material has a melting point of at least 120° C.

9. The foam of claim 1, wherein the polypropylene material is multimodal.

10. The foam of claim 1, wherein the polypropylene material is a propylene homopolymer.

11. The foam of claim 1, wherein the polypropylene material is a propylene copolymer.

12. The foam of claim 11, wherein the comonomer is ethylene and is present in an amount of 8 mol % or less.

13. The foam of claim 1, wherein the polypropylene material has been produced in the presence of a catalyst system comprising an asymmetric catalyst, wherein the catalyst system has a porosity of less than 1.40 ml/g.

14. The foam according to claim 13, wherein the asymmetric catalyst is dimethylsilyl [(2-methyl-(4'-tert. butyl)-4-phenyl-indenyl)(2-isopropyl-(4'-tert. butyl)-4-phenyl-indenyl)] zirconium dichloride.

15. A foam comprising a polypropylene material, wherein at least one of the foam and the polypropylene material have a multi-branching index of at least 0.15, wherein the multi-branching index is defined as a slope of a strain hardening index as a function of a logarithm to the basis 10 of a Hencky strain rate, defined as (log (dε/dt)), wherein:
   a) dε/dt is the deformation rate,
   b) ε is the Hencky strain, and
   c) the strain hardening index is measured at a temperature of 180° C.,
wherein the strain hardening index is defined as a slope of a logarithm to the basis 10 of the tensile stress growth function as a function of a logarithm to the basis 10 of the Hencky strain in the range of Hencky strains between 1 and 3.

16. The foam of claim 15, wherein at least one of the foam and the polypropylene material have at least one of the following properties:
   a) a branching index g' of less than 1.00; and
   a. a strain hardening index of at least 0.30 measured by a deformation rate of 1.00 $s^{-1}$ at a temperature of 180° C.

17. The foam of claim 15, wherein the polypropylene material has an amount of hot xylene insolubles of less than 0.10 percent by weight.

18. The foam of claim 15, wherein the polypropylene material has an amount of xylene solubles of less than 2.0 wt %.

19. The foam of claim 15, wherein the polypropylene material has a melt flow rate in the range of 0.01 g/10 min to 1000.00 g/10 min, measured at 230° C.

20. The foam of claim 15, wherein the polypropylene material has an mmmm pentad concentration of higher than 90%.

21. The foam of claim 15, wherein the polypropylene material has a melting point of at least 120° C.

22. The foam of claim 15, wherein the polypropylene material has been produced in the presence of a catalyst system comprising an asymmetric catalyst, wherein the catalyst system has a porosity of less than 1.40 ml/g.

23. The foam according to claim 22, wherein the asymmetric catalyst is dimethylsilyl [(2-methyl-(4'-tert. butyl)-4-phenyl-indenyl)(2-isopropyl-(4'-tert. butyl)-4-phenyl-indenyl)] zirconium dichloride.

* * * * *